United States Patent
Cho et al.

(10) Patent No.: US 11,185,832 B2
(45) Date of Patent: Nov. 30, 2021

(54) METHOD FOR MIXING HEAT-DISSIPATING MATERIAL

(71) Applicant: LG Chem, Ltd., Seoul (KR)

(72) Inventors: Yoon Gyung Cho, Daejeon (KR); Se Woo Yang, Daejeon (KR); Yang Gu Kang, Daejeon (KR); Eun Suk Park, Daejeon (KR); Hyun Suk Kim, Daejeon (KR); Hyoung Sook Park, Daejeon (KR); Sang Min Park, Daejeon (KR); Young Jo Yang, Daejeon (KR)

(73) Assignee: LG Chem, Ltd.

( * ) Notice: Subject to any disclaimer, the term of this patent is extended or adjusted under 35 U.S.C. 154(b) by 108 days.

(21) Appl. No.: 16/639,990

(22) PCT Filed: Aug. 22, 2018

(86) PCT No.: PCT/KR2018/009641
§ 371 (c)(1),
(2) Date: Feb. 18, 2020

(87) PCT Pub. No.: WO2019/039855
PCT Pub. Date: Feb. 28, 2019

(65) Prior Publication Data
US 2020/0197888 A1 Jun. 25, 2020

(30) Foreign Application Priority Data

Aug. 22, 2017 (KR) .................... 10-2017-0105933
Aug. 22, 2018 (KR) .................... 10-2018-0097733

(51) Int. Cl.
*B01F 15/00* (2006.01)
*B01F 7/00* (2006.01)

(52) U.S. Cl.
CPC .... *B01F 15/00123* (2013.01); *B01F 7/00008* (2013.01)

(58) Field of Classification Search
CPC .......... B01F 15/00123; B01F 7/00008; B29B 7/325; B29B 7/726; B29B 7/728; B29B 7/90; C09J 11/04
See application file for complete search history.

(56) References Cited

U.S. PATENT DOCUMENTS 5,720,324 A * 2/1998 Vinciarelli .............. B29C 39/08
141/1
6,769,220 B2 * 8/2004 Friesner ................ B28B 11/042
52/605

(Continued)

FOREIGN PATENT DOCUMENTS

EP    3663582 A1 * 6/2020 ............. B29B 7/726
EP    3663582 A1    6/2020

(Continued)

OTHER PUBLICATIONS

Extended European Search Report including Written Opinion for Application No. EP18847588.3, dated Jul. 13, 2020, pp. 1-7.

(Continued)

*Primary Examiner* — Tony G Soohoo
(74) *Attorney, Agent, or Firm* — Lerner, David, Littenberg, Krumholz & Mentlik, LLP (57) ABSTRACT

A method for mixing a heat-dissipating material, is provided. The method for mixing a heat-dissipating material includes determining a capacity (V) of the static mixer based on an injection amount (Q) per process unit time, a process unit time (td) and a time (t2) during which the viscosity of the heat-dissipating material flowing out of the static mixer becomes twice of the initial mixing viscosity, where when the heat-dissipating material is sequentially injected into first and second external devices using the static mixer, the (Continued)

process unit time is the difference between a first time point on which the heat-dissipating material starts to be injected into the second external device and a second time point on which the heat-dissipating material starts to be injected into the first external device.

10 Claims, 6 Drawing Sheets

(56) References Cited

U.S. PATENT DOCUMENTS

| | | | | |
|---|---|---|---|---|
| 7,044,340 | B1* | 5/2006 | McClellan | B29B 7/7457 |
| | | | | 105/215.2 |
| 7,208,192 | B2* | 4/2007 | Bunyan | H01L 23/552 |
| | | | | 427/58 |
| 11,041,103 | B2* | 6/2021 | Zhang | C09K 5/14 |
| 2003/0171487 | A1* | 9/2003 | Ellsworth | C08L 83/04 |
| | | | | 524/588 |
| 2003/0222249 | A1* | 12/2003 | Bunyan | H01L 23/552 |
| | | | | 252/500 |
| 2008/0144426 | A1 | 6/2008 | Janssen et al. | |
| 2017/0022300 | A1 | 1/2017 | Hirahara et al. | |
| 2018/0076493 | A1 | 3/2018 | Park et al. | |
| 2018/0183117 | A1 | 6/2018 | Cho et al. | |

FOREIGN PATENT DOCUMENTS

| | | | |
|---|---|---|---|
| JP | 2004277477 | A | 10/2004 |
| JP | 2007038060 | A | 2/2007 |
| JP | 2009114455 | A | 5/2009 |
| JP | 4728731 | B2 | 7/2011 |
| JP | 2011194314 | A | 10/2011 |
| JP | 5422802 | B2 | 2/2014 |
| JP | 2014076406 | A | 5/2014 |
| KR | 20090094839 | A | 9/2009 |
| KR | 20160105358 | A | 9/2016 |
| WO | 2015093611 | A1 | 6/2015 |
| WO | 2016200231 | A1 | 12/2016 |
| WO | WO-2019039855 A3 * | 4/2019 | ............ B01F 15/00 |

OTHER PUBLICATIONS

International Search Report for Application No. PCT/KR2018/009641 dated Mar. 6, 2019, 2 pages.

* cited by examiner

METHOD FOR MIXING HEAT-DISSIPATING MATERIAL

CROSS-REFERENCE TO RELATED APPLICATIONS

The present application is a national phase entry under 35 U.S.C. § 371 of International Application No. PCT/PCTKR2018/009641 filed Aug. 22, 2018, which claims priority from Korean Patent Application No. 10-2017-0105933 filed on Aug. 22, 2017 and Korean Patent Application No. 10-2018-0097733 filed on Aug. 22, 2018, the disclosures of which are incorporated herein by reference in their entirety.

TECHNICAL FIELD

The present invention relates to a method for mixing a heat-dissipating material.

BACKGROUND ART

A battery, a television, a video, a computer, a medical instrument, an office machine or a communication device, and the like generates heat during operation and a temperature rise due to the heat causes operation failure or destruction, and the like, so that a heat-dissipating method for suppressing the temperature rise or a heat-dissipating member used for the method, and the like has been proposed.

For example, there is known a method in which heat is transferred to a cooling medium such as cooling water, or a temperature rise is suppressed through heat conduction to a heat sink using a metal plate or the like having a high thermal conductivity such as aluminum or copper.

In order to efficiently transfer heat from a heat source to a cooling medium or a heat sink, it is advantageous that the heat source adheres to the cooling medium or the heat sink as close as possible or is thermally connected thereto, and a heat-dissipating material can be used for this purpose.

For two-component room-temperature curing high-viscosity fluids in heat-dissipating materials, the capacity of the mixer should be optimized according to mixing efficiency or reaction rates.

For example, if the number of mixers is excessively large or the length is long, the dispensing speed is adversely affected, whereas if the number or length is insufficient, the mixing efficiency is lowered, thereby resulting in deterioration of physical properties due to non-uniform cured products.

DISCLOSURE

Technical Problem

It is a problem to be solved by the present invention to provide a method for mixing a heat-dissipating material that can optimize the capacity of a static mixer according to a heat-dissipating material.

Technical Solution

To solve the above-described problem, according to one aspect of the present invention, there is provided a method for mixing a heat-dissipating material comprising a room-temperature curing filler with a static mixer, wherein the method for mixing a heat-dissipating material comprises a step of determining a capacity (V) of the static mixer based on an injection amount (Q) per process unit time, a process unit time (td) and a time (t2) during which the viscosity of the heat-dissipating material flowing out of the static mixer becomes twice of the initial mixing viscosity, where when the heat-dissipating material is sequentially injected into first and second external devices using the static mixer, the process unit time is the difference between a first time point on which the heat-dissipating material starts to be injected into the second external device and a second time point on which the heat-dissipating material starts to be injected into the first external device.

The capacity (V) of the static mixer can be determined by Equation 1 below.

$$V < (t2/td) * Q \qquad \text{[Equation 1]}$$

In Equation 1, the unit of the capacity of the static mixer may be ml, the unit of the injection amount (Q) may be ml, and the unit of the process unit time (td) and the time (t2) during which the viscosity becomes twice of the initial mixing viscosity may be min.

The mixing method may further comprise a step of performing mixing of the heat-dissipating material at a Reynolds number (Re) of 10 to 1000.

In addition, the static mixer may have a number of elements of 5 to 25.

The time (t2) during which the viscosity becomes twice of the initial mixing viscosity may be from 1 minute to 10 minutes. On the other hand, the time (t2) during which the viscosity becomes twice of the initial mixing viscosity may be measured in the following method. For example, the heat-dissipating material flowing out of the static mixer is measured in a frequency sweep mode using an ARES (advanced rheometric expansion system), which is a rheological property measuring device, within one minute, but the mixed viscosity at a shear rate of 2.5/s is measured, and the mixed viscosities are measured three times or more over time, and then the time during which the viscosity is doubled as compared with the initial viscosity can be obtained through plot based on the measured mixed viscosities.

In addition, the heat-dissipating material may have a thermal conductivity of 1.0 W/mK or more.

Also, the heat-dissipating material may have a viscosity of 10 to 300,000 cP.

Each of the first and second external devices may be a battery module.

Furthermore, when the heat-dissipating material is injected into the first external device using a plurality of static mixers, the capacity of each static mixer can be determined based on the injection amount (Q) per process unit time for each static mixer, the process unit time (td) and the time (t2) during which the viscosity of the heat-dissipating material flowing out of each static mixer becomes twice of the initial mixing viscosity.

In addition, when it is injected using a plurality of static mixers, the respective static mixers can be determined to have the same capacity.

Advantageous Effects

As described above, the mixing method of the heat-dissipating material related to one example of the present invention has the following effect.

The capacity (V) of the static mixer can be determined based on the injection amount (Q) per process unit time for each static mixer, the process unit time (td) and the time (t2)

during which the viscosity becomes twice of the initial mixing viscosity, whereby the capacity of the static mixer can be optimized.

MODE FOR INVENTION

Hereinafter, a method for mixing a heat-dissipating material according to one example of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

Figure 1:
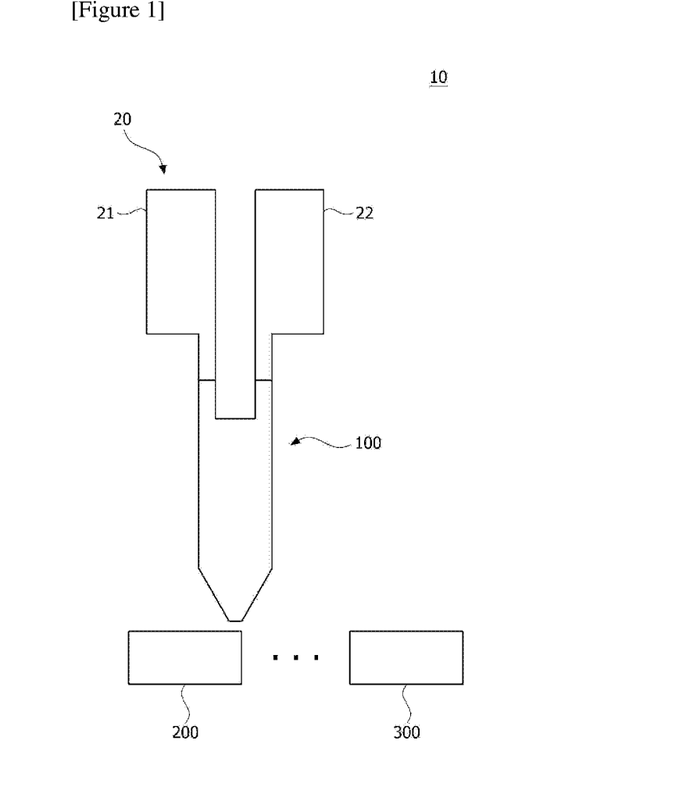
FIG. 1 is a schematic diagram showing a dispensing apparatus used in a mixing method of a heat-dissipating material related to one example of the present invention.
Figure 2:
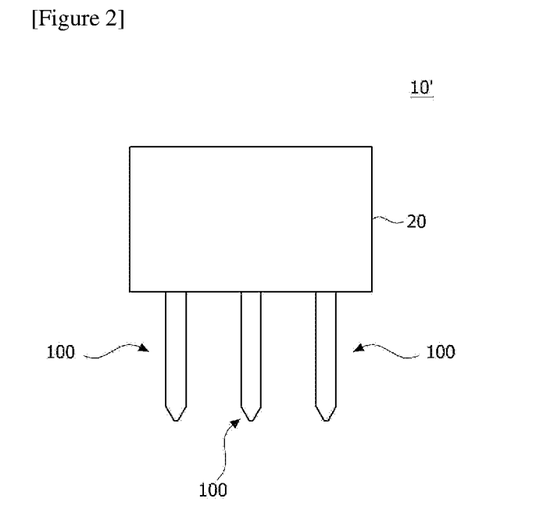
FIG. 2 is a schematic diagram showing another embodiment of the dispensing apparatus.
Figure 3:
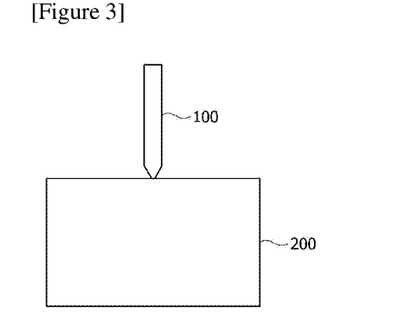
FIGS. 3 and 4 are schematic diagrams showing embodiments in which a heat-dissipating material is injected into a first external device.
Figure 4:
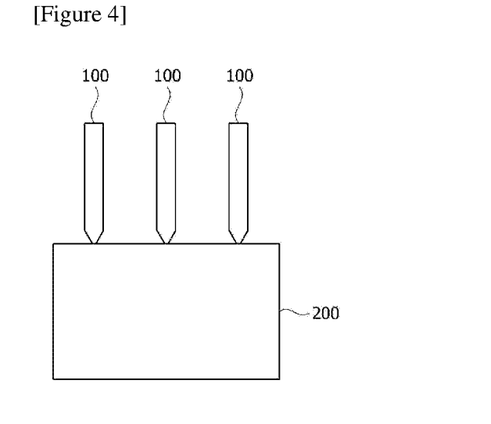

FIG. 1 is a schematic diagram showing a dispensing apparatus (10) used in a mixing method of a heat-dissipating material related to one example of the present invention, FIG. 2 is a schematic diagram showing another embodiment of a dispensing apparatus (10'), and FIGS. 3 and 4 are schematic diagrams showing embodiments in which a heat-dissipating material is injected into a first external device (200).

Figure 5:
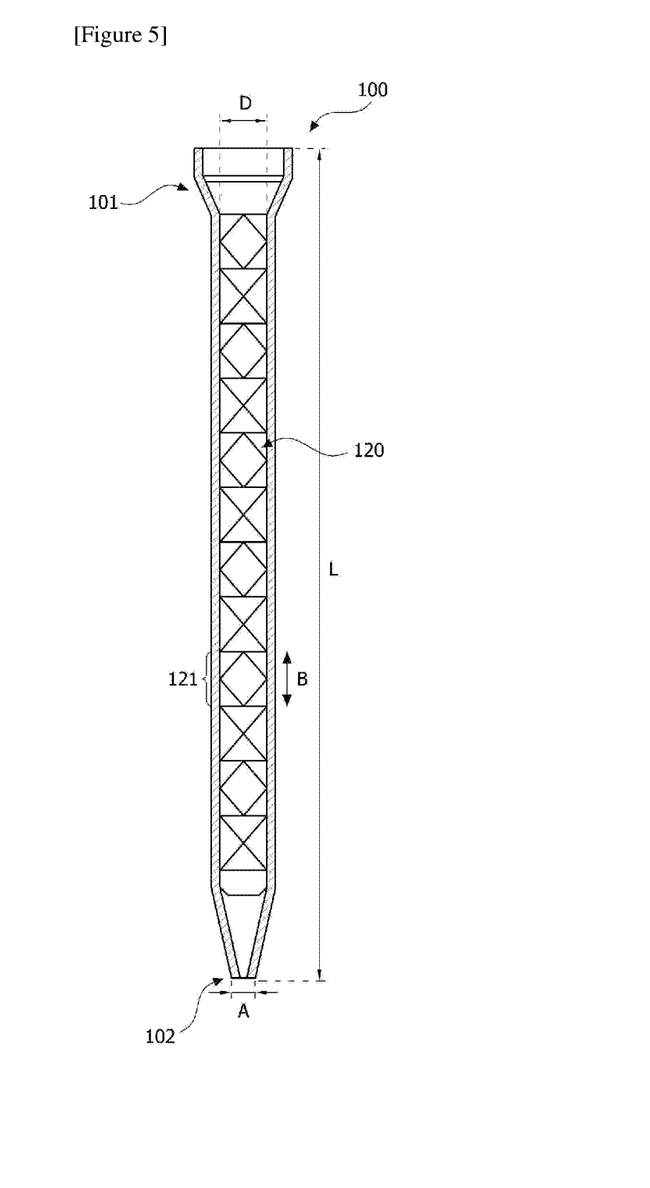
FIG. 5 is a schematic diagram of the static mixer shown in FIG. 1.

Also, FIG. 5 is a schematic diagram of the static mixer (100) shown in FIG. 1.

The mixing method of a heat-dissipating material related to one example of the present invention is a method for mixing a heat-dissipating material comprising a room-temperature curing filler using a plurality of static mixers.

Referring to FIG. 1, a heat-dissipating material related to the present invention may be injected into an external device (200, 300) through a dispensing apparatus (10). The dispensing apparatus (10) comprises a dispensing part (20) and one or more static mixers (100) connected to the dispensing part (20).

The external device may be a battery module.

In this document, the first external device refers to a first battery module and the second external device refers to a second battery module. The first and second battery modules are merely terms that are stated separately in order to explain process units in turn, and have the same structure.

The production method of the battery module may comprise steps of providing a battery module, mixing a heat-dissipating material and injecting the heat-dissipating material. At this time, the mixing and the injection of the heat-dissipating material are performed through static mixers. In addition, the mixing of the heat-dissipating material may be performed in each static mixer (100), and the injection of the heat-dissipating material for one battery module may be performed through a plurality of static mixers (100).

Figure 6:
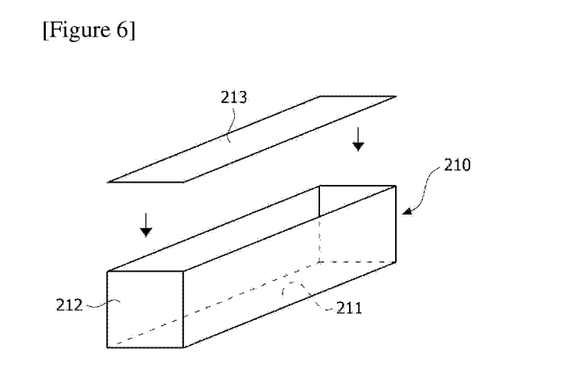
FIG. 6 is a schematic diagram of a module case constituting a battery module.
Figure 7:
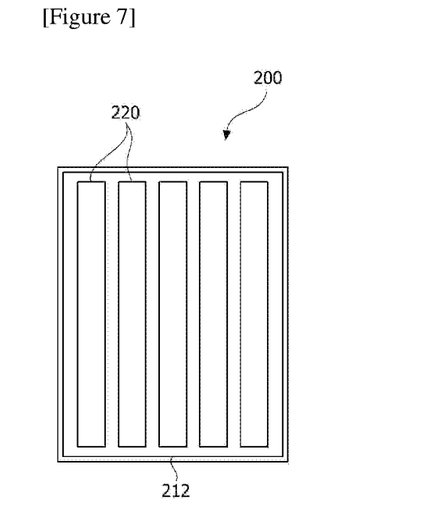
FIG. 7 is a schematic diagram showing a battery module.
Figure 8:
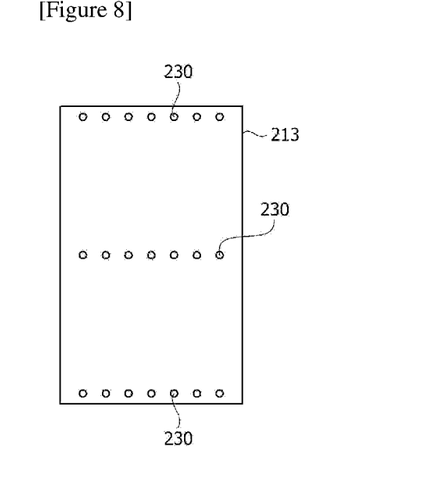
FIG. 8 is a schematic diagram for explaining injection holes of a module case.

FIG. 6 is a schematic diagram of a module case (210) constituting a battery module, FIG. 7 is a schematic diagram showing a battery module (200), and FIG. 8 is a schematic diagram for explaining injection holes (230) of a module case.

The battery module (200) comprises a module case (210) and a plurality of battery cells (220) disposed in the module case (210). The battery cell (220) may be a pouch-type secondary battery. The battery cell (200) may typically comprise an electrode assembly, an electrolyte, and a pouch exterior material. The heat-dissipating material is injected into spaces between the battery cells in the module case and functions to dissipate heat generated in the battery cells (220).

The module case (210) may have, for example, a cuboidal shape and may have a bottom surface (211), side surfaces (212) and a top surface (213). At this time, one or more injection holes (230) may be formed on the top surface (213). At this time, one static mixer (100) is connected to one injection hole (230), so that the heat-dissipating material flowing out of the static mixer (100) can be injected into the battery module (200) through the injection hole (230).

In addition, the step of injecting a heat-dissipating material may be sequentially performed on a plurality of battery modules. For example, referring to FIG. 1, after the heat-dissipating material is completely injected into the first battery module (200), the heat-dissipating material may be injected into the second battery module (300). The first and second battery modules (200, 300) are transferred by a transfer part (for example, a belt conveyor) and sequentially passed through the dispensing apparatus (100), whereby a heat-dissipating material can be injected.

In the step of injecting a heat-dissipating material, referring to FIG. 3, the heat-dissipating material may also be injected into one battery module (for example, the first battery module, 200) through one static mixer, and referring to FIG. 4, the heat-dissipating material may be injected into one battery module (for example, the first battery module, 200) through a plurality of static mixers (100).

The dispensing apparatus (100) for mixing and injecting a heat-dissipating material, related to the present invention, comprises a dispensing part (20) and one or more static mixers (100) connected to the dispensing part (20).

Also, the heat-dissipating material mixed through the static mixer and injected into a battery module relates to a thermally conductive resin composition. The resin composition may comprise a resin component and a thermally conductive filler.

The dispensing part (20) comprises a first supply cartridge portion (21) and a second supply cartridge portion (22). At this time, the first supply cartridge portion (21) and the second supply cartridge portion (22) are connected to the static mixer (100) individually. The first supply cartridge portion (21) supplies a main resin and a thermally conductive filler for forming a resin composition to the static mixer (100) and the second supply cartridge portion (22) supplies a curing agent and a thermally conductive filler to the static mixer (100).

Referring to FIG. 5, the static mixer (100) has an inflow part (101) and an outflow part (102). As described above, the inflow part (101) is provided to be separately connected to the first supply cartridge portion (21) and the second supply cartridge portion (22), and the outflow part (102) is provided to be connected to injection holes (230) provided at the module case (210) of the battery module (200).

The static mixer (100) comprises a screw part (120) for mixing and transfer. The screw part (120) is composed of a plurality of elements (121) and one element (121) forms one stage (B), where the number of elements (121) can be referred to as a number of stages.

At this time, the number of elements (121) of the static mixer (100) may be 5 to 25. If the number of elements (121) is insufficient, the mixing efficiency lowers, which may affect the curing speed, the adhesive force, the insulating property, and the like, or cause reliability problems. Alternatively, if the number of elements (121) is excessively large, a mixer having a small diameter and a long length is used to maintain the same mixer capacity, and thus the process speed is lowered.

In one embodiment, the static mixer (100) has a mixer inner diameter (D) of about 9 mm, where the screw part (120) is disposed, a screw part (120) width of 5 mm, an outflow part (102) diameter (A) of 3 mm, a mixer length (L) of 225 mm and a number of stages of 24.

One example of the present invention provides a method of mixing and injecting a heat-dissipating material containing a room-temperature curing filler with a static mixer.

When the heat-dissipating material is sequentially injected into first and second external devices using the static mixer, the process unit time is the difference between a first time point on which the heat-dissipating material starts to be injected into the second external device and a second time point on which the heat-dissipating material starts to be injected into the first external device. For example, the first time point on which the heat-dissipating material is injected into the first external device (the first battery module, 200) is 0:00 and the second time point on which the heat-dissipating material is injected into the second external device (the first battery module, 200) after the injection of the first external device is completed is 3:30, where the process unit time is 3 minutes.

At this time, the mixing method of the heat-dissipating material comprises a step of determining a capacity (V) of the static mixer based on an injection amount (Q) per process unit time, a process unit time (td) and a time (t2) during which the viscosity of the heat-dissipating material flowing out of the static mixer (100) becomes twice of the initial mixing viscosity.

That is, the capacity (V) of the static mixer (100) can be determined according to an injection amount (Q) per process unit time, in which a heat-dissipating material is injected into a battery module with a static mixer, a process unit time (td) and a time (t2) during which the viscosity of the heat-dissipating material flowing out of the static mixer (100) becomes twice of the initial mixing viscosity.

The capacity (V) of the static mixer can be determined by Equation 1 below.

$$V<(t2/td)*Q \qquad \text{[Equation 1]}$$

In Equation 1, the unit of the capacity of the static mixer may be ml, the unit of the injection amount (Q) may be ml, and the unit of the process unit time (td) and the time (t2) during which the initial mixing viscosity is doubled may be min.

The mixing method may further comprise a step of performing mixing of the heat-dissipating material at a Reynolds number (Re) of 10 to 1000.

Also, as described above, the static mixer may have 5 to 25 elements.

The heat-dissipating material may have a thermal conductivity of 1.0 W/mK or more, and the heat radiation material may also have a viscosity of 10 to 300,000 cP.

Also, as in FIG. 4, when the heat-dissipating material is injected into the first external device (the first battery module, 200) using the plurality of static mixers (100), the capacity (100) of each static mixer can be determined based on an injection amount (Q) per process unit time for each static mixer (100), a process unit time (td) and a time (t2) during which the viscosity of the heat-dissipating material flowing out of each static mixer (100) becomes twice of the initial mixing viscosity.

In addition, upon being injected using the plurality of static mixers, the respective static mixers can be determined to have the same capacity.

The capacity (V) of each static mixer can be determined by Equation 1 below.

$$V<t2/td*Q \qquad \text{[Equation 1]}$$

In Equation 1, the unit of the capacity of the static mixer may be ml, the unit of the injection amount (Q) may be ml, and the unit of the process unit time (td) and the time (t2) during which the initial mixing viscosity is doubled may be min.

On the other hand, when the capacity (V) of the static mixer is larger than the capacity satisfying Equation 1, the capacity (V) exceeds the usage per unit process, whereby the time during which the heat-dissipating material stays in the static mixer increases, and the process speed is slower or, in severe cases, there is a possibility that the static mixer (100) is clogged.

On the other hand, the heat-dissipating material relates to a thermally conductive resin composition. The resin composition may comprise a resin component and a thermally conductive filler.

In one example, the resin composition may be an adhesive composition, for example, a composition capable of forming an adhesive through a curing reaction or the like. Such a resin composition may be a solvent type resin composition, a water-based resin composition, or a solventless-type resin composition. For example, the resin composition may be prepared by compounding a thermally conductive filler, which is described below, to a resin composition capable of forming a known acrylic adhesive, epoxy adhesive, urethane adhesive, olefin adhesive, EVA (ethylene vinyl acetate) adhesive or silicone adhesive.

The term resin component is generally used as a meaning to include components known as resins as well as components that can be converted into resins through a curing reaction or a polymerization reaction.

In one example, as the resin component, an adhesive resin or a precursor capable of forming an adhesive resin can be applied. An example of such a resin component includes an acrylic resin, an epoxy resin, a urethane resin, an olefin resin, an EVA (ethylene vinyl acetate) resin or a silicone resin, and the like, or a precursor such as a polyol or an isocyanate compound, and the like, but is not limited thereto.

The resin composition may comprise a thermally conductive filler together with the resin component. The term thermally conductive filler means a material having a thermal conductivity of about 1 W/mK or more, about 5 W/mK or more, about 10 W/mK or more, or about 15 W/mK or more. The thermal conductivity of the thermally conductive filler may be about 400 W/mK or less, about 350 W/mK or less, or about 300 W/mK or less. The kind of thermally conductive filler is not particularly limited, but ceramic fillers may be applied in consideration of insulation and the like. For example, ceramic particles such as alumina, AlN (aluminum nitride), BN (boron nitride), silicon nitride, SiC or BeO may be used. If insulation properties may be secured, application of carbon fillers such as graphite may also be considered.

The resin composition may comprise about 600 parts by weight or more of the thermally conductive filler relative to 100 parts by weight of the resin component. In another example, the ratio of the filler may be 650 parts by weight or more, or 700 parts by weight or more, relative to 100 parts by weight of the resin component. The ratio may be about 2,000 parts by weight or less, about 1,500 parts by weight or less, or about 1,100 parts by weight or less, relative to 100 parts by weight of the resin component. Within the ratio range of the filler, it is possible to secure desired physical properties such as thermal conductivity and insulation.

If the excessive amount of the filler as above is applied for securing the thermal conductivity and the insulation, the viscosity of the resin composition is greatly increased and accordingly, the handling property is lowered, and even after the resin material is formed, it contains bubbles or voids, so that the thermal conductivity may be deteriorated.

Accordingly, a filler having at least three different diameters may be applied to the resin composition at a predetermined ratio.

The shape of the filler is not particularly limited, which may be selected in consideration of viscosity and thixotropy of the resin composition, possibility of settling in the composition, the target thermal resistance or thermal conductivity, insulation, a filling effect or dispersibility, and the like. For example, considering the amount to be filled, it is advantageous to use a spherical filler, but in consideration of formation of a network, conductivity, thixotropy and the like, a non-spherical filler, for example, a filler having a shape such as a needle shape or a plate shape can also be used.

The resin composition basically comprises the above components, that is, the resin component and the thermally conductive filler, and if necessary, it may also comprise other components. For example, the resin composition may further comprise a viscosity control agent, such as a thixotropic agent, a diluent, a dispersant, a surface treatment agent or a coupling agent, for control of viscosity, for example, for increasing or decreasing viscosity, or for control of viscosity according to shear force.

The thixotropic agent can control the viscosity according to the shear force of the resin composition so that the manufacturing process of the battery module can be effectively performed. The usable thixotropic agent can be exemplified by fumed silica and the like.

The diluent or dispersant is usually used for lowering the viscosity of the resin composition, and any of various kinds known in the art can be used without limitation as long as it can exhibit the above action.

The surface treating agent is used for surface treatment of the filler introduced into the resin composition, and any of various kinds known in the art can be used without limitation as long as it can exhibit the above action.

The coupling agent may be used, for example, to improve the dispersibility of the thermally conductive filler such as alumina, and any of various kinds known in the art may be used without limitation as long as it can exhibit the above action.

The resin composition may further comprise a flame retardant or a flame retardant auxiliary agent, and the like. Such a resin composition can form a flame retardant resin composition. As the flame retardant, various known flame retardants can be applied without particular limitation, and for example, a solid filler-shaped flame retardant or a liquid flame retardant, and the like can be applied. The flame retardant includes, for example, an organic flame retardant such as melamine cyanurate, or an inorganic flame retardant such as magnesium hydroxide, and the like, but is not limited thereto.

When the amount of the filler to be filled in the resin composition is large, a liquid type flame retardant material (TEP, triethyl phosphate or TCPP, tris(1,3-chloro-2-propyl) phosphate, etc.) may also be used. Furthermore, a silane coupling agent capable of acting as a flame retardant synergist may also be added.

EXAMPLES

The heat-dissipating material may be a heat-dissipating filler high-viscosity two-component room-temperature curing urethane. Also, the heat-dissipating material may have a thermal conductivity of 1.0 W/mK or more, and the heat-dissipating material may have a viscosity of 10 to 300,000 cP. Furthermore, the specific gravity may be 3 g/cm$^3$, the mixer diameter may be 10 mm, and the flow rate may be 0.25 cm$^3$/sec.

In addition, when the viscosity is calculated as 100,000, the Reynolds number (Re) may be 58 and the number of elements may be 12. At this time, the lower the viscosity, the smaller the number of elements required. For example, when the viscosity is 100,000 to 1,000,000, the number of elements may be 12 to 25.

Also, the time (t2) during which the initial mixing viscosity becomes twice may be from 1 minute to 10 minutes, the process unit time (td) may be 3 minutes, and the injection amount (Q) for each static mixer may be 30 ml. At this time, if the time (t2) during which the initial mixing viscosity is doubled is 3 minutes, the static mixer maximum capacity (V) is 30 ml upon calculation by Equation 1.

The curing speed is set to 100 as a normal curing speed at a target mixing ratio (for example, two-component type 1:1), where on the basis of this, the speed according to the curing time under the same curing condition can be relativized. Also, as an actual process unit time is compared with a target process time, the processability is classified into "O" if the actual process unit time is equal to or faster than the target process time, and "X" if the actual process unit time is slower than that.

The processability according to the number of elements, the curing speed, t2, td, Q and V is shown in Table 1 below.

TABLE 1

| Classification | Re | Number of Elements | Curing Speed | t2 (min) | Td (min) | Q (ml) | V (ml) | Processability |
|---|---|---|---|---|---|---|---|---|
| Example 1 | 58 | 12 | 100 | 3 | 3 | 30 | 20 | O |
| Example 2 | 58 | 8 | 75 | 3 | 3 | 30 | 20 | O |
| Example 3 | 58 | 4 | 21 | 3 | 3 | 30 | 20 | O |
| Comparative Example 1 | 58 | 30 | 100 | 3 | 3 | 30 | 20 | X |
| Comparative Example 2 | 58 | 12 | 100 | 3 | 3 | 30 | 50 | X |

Through Table 1 above, it can be confirmed that the processability can be ensured by satisfying Equation 1.

The preferred examples of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

According to the mixing method of the heat-dissipating material related to one example of the present invention, the capacity of the static mixer can be optimized in correspondence with the heat-dissipating material.

The invention claimed is:

1. A method for mixing a heat-dissipating material comprising:
determining a capacity (V) of a static mixer based on an injection amount (Q) per process unit time, a process unit time (td) and a time (t2) during which a viscosity of the heat-dissipating material flowing out of the static mixer becomes twice of an initial mixing viscosity, wherein when the heat-dissipating material is sequentially injected into first and second external devices using the static mixer, the process unit time is the difference between a first time point on which the heat-dissipating material is injected into the second external device and a second time point on which the heat-dissipating material is injected into the first external device.

2. The method according to claim 1, wherein the capacity of the static mixer (V) is determined by Equation 1 below:

$$V < (t2/td) * Q \qquad \text{[Equation 1]}$$

3. The method according to claim 1, further comprising:
performing mixing of the heat-dissipating material at a Reynolds number (Re) of 10 to 1000.

4. The method according to claim 1, wherein the static mixer has a number of elements of 5 to 25.

5. The method according to claim 1, wherein the time (t2) during which the initial mixing viscosity becomes twice is from 1 minute to 10 minutes.

6. The method according to claim 1, wherein the heat-dissipating material has a thermal conductivity of 1.0 W/mK or more.

7. The method according to claim 1, wherein the heat-dissipating material has a viscosity of 10 to 300,000 cP.

8. The method according to claim 1, wherein the first and second external devices are each a battery module.

9. The method according to claim 1, wherein when the heat-dissipating material is injected into the first external device using a plurality of static mixers, the capacity of each static mixer is determined based on the injection amount (Q) per process unit time for each static mixer, the process unit time (td) and the time (t2) during which the viscosity of the heat-dissipating material flowing out of each static mixer becomes twice of the initial mixing viscosity.

10. The method according to claim 9, wherein when the heat-dissipating material is injected using the plurality of static mixers, the respective static mixers are determined to have the same capacity.

* * * * *